US005862271A

United States Patent [19]

Petrie

[11] Patent Number: 5,862,271

[45] Date of Patent: Jan. 19, 1999

[54] PARALLEL PROPAGATING EMBEDDED BINARY SEQUENCES FOR CHARACTERIZING AND PARAMETERIZING TWO DIMENSIONAL IMAGE DOMAIN CODE PATTERNS IN N-DIMENSIONAL ADDRESS SPACE

[75] Inventor: Glen W. Petrie, Los Gatos, Calif.

[73] Assignee: Xerox Corporation, Stamford, Conn.

[21] Appl. No.: 772,159

[22] Filed: Dec. 20, 1996

[51] Int. Cl.[6] .............................. G06K 9/36; G06K 9/03; G06K 10/06

[52] U.S. Cl. ........................... 382/309; 382/232; 235/494

[58] Field of Search .................................... 382/232, 309, 382/306, 243; 235/494, 456, 487, 462, 454, 470, 432; 358/403; 380/51; 283/70

[56] References Cited

U.S. PATENT DOCUMENTS

| | | | |
|---|---|---|---|
| 4,652,730 | 3/1987 | Marshall | 235/456 |
| 4,692,603 | 9/1987 | Brass et al. | 235/454 |
| 5,521,372 | 5/1996 | Hecht et al. | 235/494 |
| 5,576,532 | 11/1996 | Hecht | 235/494 |
| 5,625,721 | 4/1997 | Lopresti et al. | 382/309 |

*Primary Examiner*—David K. Moore
*Assistant Examiner*—Wenpeng Chen

[57] ABSTRACT

A self-clocking glyph code pattern is parameterized in at least one further dimension by the selection of the parallel propagating unique numeric sequences that are employed for parameterizing the code pattern in two-dimensional space and additional sequence is embedded in the code pattern for identifying the parameterizing sequences that are being used.

4 Claims, 13 Drawing Sheets

| | | | | | | | | | | | | | | | | |
|---|---|---|---|---|---|---|---|---|---|---|---|---|---|---|---|---|
| X00 | X01 | X02 | X03 | X04 | X05 | X06 | X07 | X08 | X09 | X0A | X0B | X0C | X0D | X0E | X0F | X10 |
| Y00 | Y01 | Y02 | Y03 | Y04 | Y05 | Y06 | Y07 | Y08 | Y09 | Y0A | Y0B | Y0C | Y0D | Y0E | Y0F | Y10 |
| X00 | X01 | X02 | X03 | X04 | X05 | X06 | X07 | X08 | X09 | X0A | X0B | X0C | X0D | X0E | X0F | X10 |
| YFF | Y00 | Y01 | Y02 | Y03 | Y04 | Y05 | Y06 | Y07 | Y08 | Y09 | Y0A | Y0B | Y0C | Y0D | Y0E | Y0F |
| X00 | X01 | X02 | X03 | X04 | X05 | X06 | X07 | X08 | X09 | X0A | X0B | X0C | X0D | X0E | X0F | X10 |
| YFE | YFF | Y00 | Y01 | Y02 | Y03 | Y04 | Y05 | Y06 | Y07 | Y08 | Y09 | Y0A | Y0B | Y0C | Y0D | Y0E |
| X00 | X01 | X02 | X03 | X04 | X05 | X06 | X07 | X08 | X09 | X0A | X0B | X0C | X0D | X0E | X0F | X10 |
| YFD | YFE | YFF | Y00 | Y01 | Y02 | Y03 | Y04 | Y05 | Y06 | Y07 | Y08 | Y09 | Y0A | Y0B | Y0C | Y0D |
| X00 | X01 | X02 | X03 | X04 | X05 | X06 | X07 | X08 | X09 | X0A | X0B | X0C | X0D | X0E | X0F | X10 |
| YFC | YFD | YFE | YFF | Y00 | Y01 | Y02 | Y03 | Y04 | Y05 | Y06 | Y07 | Y08 | Y09 | Y0A | Y0B | Y0C |
| X00 | X01 | X02 | X03 | X04 | X05 | X06 | X07 | X08 | X09 | X0A | X0B | X0C | X0D | X0E | X0F | X10 |
| YFB | YFC | YFD | YFE | YFF | Y00 | Y01 | Y02 | Y03 | Y04 | Y05 | Y06 | Y07 | Y08 | Y09 | Y0A | Y0B |
| X00 | X01 | X02 | X03 | X04 | X05 | X06 | X07 | X08 | X09 | X0A | X0B | X0C | X0D | X0E | X0F | X10 |
| YFB | YFB | YFC | YFD | YFE | YFF | Y00 | Y01 | Y02 | Y03 | Y04 | Y05 | Y06 | Y07 | Y08 | Y09 | Y0A |
| X00 | X01 | X02 | X03 | X04 | X05 | X06 | X07 | X08 | X09 | X0A | X0B | X0C | X0D | X0E | X0F | X10 |
| YFA | YFB | YFB | YFC | YFD | YFE | YFF | Y00 | Y01 | Y02 | Y03 | Y04 | Y05 | Y06 | Y07 | Y08 | Y09 |
| X00 | X01 | X02 | X03 | X04 | X05 | X06 | X07 | X08 | X09 | X0A | X0B | X0C | X0D | X0E | X0F | X10 |
| YF9 | YFA | YFB | YFB | YFC | YFD | YFE | YFF | Y00 | Y01 | Y02 | Y03 | Y04 | Y05 | Y06 | Y07 | Y08 |
| X00 | X01 | X02 | X03 | X04 | X05 | X06 | X07 | X08 | X09 | X0A | X0B | X0C | X0D | X0E | X0F | X10 |
| YF8 | YF9 | YFA | YFB | YFB | YFC | YFD | YFE | YFF | Y00 | Y01 | Y02 | Y03 | Y04 | Y05 | Y06 | Y07 |
| X00 | X01 | X02 | X03 | X04 | X05 | X06 | X07 | X08 | X09 | X0A | X0B | X0C | X0D | X0E | X0F | X10 |

FIG. 2

| | | | | | | | | | | | | | | | | |
|---|---|---|---|---|---|---|---|---|---|---|---|---|---|---|---|---|
| Z00 | Z01 | Z02 | Z03 | Z04 | Z05 | Z06 | Z07 | Z08 | Z09 | Z0A | Z0B | Z0C | Z0D | Z0E | Z0F | Z10 |
| Z00 | Z01 | Z02 | Z03 | Z04 | Z05 | Z06 | Z07 | Z08 | Z09 | Z0A | Z0B | Z0C | Z0D | Z0E | Z0F | Z10 |
| Z00 | Z01 | Z02 | Z03 | Z04 | Z05 | Z06 | Z07 | Z08 | Z09 | Z0A | Z0B | Z0C | Z0D | Z0E | Z0F | Z10 |
| ZFF | Z00 | Z01 | Z02 | Z03 | Z04 | Z05 | Z06 | Z07 | Z08 | Z09 | Z0A | Z0B | Z0C | Z0D | Z0E | Z0F |
| Z00 | Z01 | Z02 | Z03 | Z04 | Z05 | Z06 | Z07 | Z08 | Z09 | Z0A | Z0B | Z0C | Z0D | Z0E | Z0F | Z10 |
| ZFE | ZFF | Z00 | Z01 | Z02 | Z03 | Z04 | Z05 | Z06 | Z07 | Z08 | Z09 | Z0A | Z0B | Z0C | Z0D | Z0E |
| Z00 | Z01 | Z02 | Z03 | Z04 | Z05 | Z06 | Z07 | Z08 | Z09 | Z0A | Z0B | Z0C | Z0D | Z0E | Z0F | Z10 |
| ZFD | ZFE | ZFF | Z00 | Z01 | Z02 | Z03 | Z04 | Z05 | Z06 | Z07 | Z08 | Z09 | Z0A | Z0B | Z0C | Z0D |
| Z00 | Z01 | Z02 | Z03 | Z04 | Z05 | Z06 | Z07 | Z08 | Z09 | Z0A | Z0B | Z0C | Z0D | Z0E | Z0F | Z10 |
| ZFC | ZFD | ZFE | ZFF | Z00 | Z01 | Z02 | Z03 | Z04 | Z05 | Z06 | Z07 | Z08 | Z09 | Z0A | Z0B | Z0C |
| Z00 | Z01 | Z02 | Z03 | Z04 | Z05 | Z06 | Z07 | Z08 | Z09 | Z0A | Z0B | Z0C | Z0D | Z0E | Z0F | Z10 |
| ZFB | ZFC | ZFD | ZFE | ZFF | Z00 | Z01 | Z02 | Z03 | Z04 | Z05 | Z06 | Z07 | Z08 | Z09 | Z0A | Z0B |
| Z00 | Z01 | Z02 | Z03 | Z04 | Z05 | Z06 | Z07 | Z08 | Z09 | Z0A | Z0B | Z0C | Z0D | Z0E | Z0F | Z10 |
| ZFB | ZFB | ZFC | ZFD | ZFE | ZFF | Z00 | Z01 | Z02 | Z03 | Z04 | Z05 | Z06 | Z07 | Z08 | Z09 | Z0A |
| Z00 | Z01 | Z02 | Z03 | Z04 | Z05 | Z06 | Z07 | Z08 | Z09 | Z0A | Z0B | Z0C | Z0D | Z0E | Z0F | Z10 |
| ZFA | ZFB | ZFB | ZFC | ZFD | ZFE | ZFF | Z00 | Z01 | Z02 | Z03 | Z04 | Z05 | Z06 | Z07 | Z08 | Z09 |
| Z00 | Z01 | Z02 | Z03 | Z04 | Z05 | Z06 | Z07 | Z08 | Z09 | Z0A | Z0B | Z0C | Z0D | Z0E | Z0F | Z10 |
| ZF9 | ZFA | ZFB | ZFB | ZFC | ZFD | ZFE | ZFF | Z00 | Z01 | Z02 | Z03 | Z04 | Z05 | Z06 | Z07 | Z08 |
| Z00 | Z01 | Z02 | Z03 | Z04 | Z05 | Z06 | Z07 | Z08 | Z09 | Z0A | Z0B | Z0C | Z0D | Z0E | Z0F | Z10 |
| ZF8 | ZF9 | ZFA | ZFB | ZFB | ZFC | ZFD | ZFE | ZFF | Z00 | Z01 | Z02 | Z03 | Z04 | Z05 | Z06 | Z07 |
| Z00 | Z01 | Z02 | Z03 | Z04 | Z05 | Z06 | Z07 | Z08 | Z09 | Z0A | Z0B | Z0C | Z0D | Z0E | Z0F | Z10 |

FIG. 3

| | | | | | | | | | | | | | | | | | |
|---|---|---|---|---|---|---|---|---|---|---|---|---|---|---|---|---|---|
| X00 | Y00 | X01 | Y01 | X02 | Y02 | X03 | Y03 | X04 | Y04 | X05 | Y05 | X06 | Y06 | X07 | Y07 | X08 | ... |
| X00 | YFF | X01 | Y00 | X02 | Y01 | X03 | Y02 | X04 | Y03 | X05 | Y04 | X06 | Y05 | X07 | Y06 | X08 | ... |
| X00 | YFE | X01 | YFF | X02 | Y00 | X03 | Y01 | X04 | Y02 | X05 | Y03 | X06 | Y04 | X07 | Y05 | X08 | ... |
| X00 | YFD | X01 | YFE | X02 | YFF | X03 | Y00 | X04 | Y01 | X05 | Y02 | X06 | Y03 | X07 | Y04 | X08 | ... |
| ... | ... | ... | ... | ... | ... | ... | ... | ... | ... | ... | ... | ... | ... | ... | ... | ... | ... |
| ... | ... | ... | ... | ... | ... | ... | ... | ... | ... | ... | ... | ... | ... | ... | ... | ... | ... |

FIG. 4

| | | | | | | | | | | | | | | | | | |
|---|---|---|---|---|---|---|---|---|---|---|---|---|---|---|---|---|---|
| X00 | Y00 | X01 | Y01 | X02 | Y02 | X03 | Y03 | X04 | Y04 | X05 | Y05 | X06 | Y06 | X07 | Y07 | X08 | ... |
| D | D | D | D | D | D | D | D | D | D | D | D | D | D | D | D | D | ... |
| D | D | D | D | D | D | D | D | D | D | D | D | D | D | D | D | D | ... |
| D | D | D | D | D | D | D | D | D | D | D | D | D | D | D | D | D | ... |
| D | D | D | D | D | D | D | D | D | D | D | D | D | D | D | D | D | ... |
| X00 | YFF | X01 | Y00 | X02 | Y01 | X03 | Y02 | X04 | Y03 | X05 | Y04 | X06 | Y05 | X07 | Y06 | X08 | ... |
| D | D | D | D | D | D | D | D | D | D | D | D | D | D | D | D | D | ... |
| D | D | D | D | D | D | D | D | D | D | D | D | D | D | D | D | D | ... |
| D | D | D | D | D | D | D | D | D | D | D | D | D | D | D | D | D | ... |
| D | D | D | D | D | D | D | D | D | D | D | D | D | D | D | D | D | ... |
| X00 | YFE | X01 | YFF | X02 | Y00 | X03 | Y01 | X04 | Y02 | X05 | Y03 | X06 | Y04 | X07 | Y05 | X08 | ... |
| D | D | D | D | D | D | D | D | D | D | D | D | D | D | D | D | D | ... |
| D | D | D | D | D | D | D | D | D | D | D | D | D | D | D | D | D | ... |
| D | D | D | D | D | D | D | D | D | D | D | D | D | D | D | D | D | ... |
| D | D | D | D | D | D | D | D | D | D | D | D | D | D | D | D | D | ... |
| X00 | YFD | X01 | YFE | X02 | YFF | X03 | Y00 | X04 | Y01 | X05 | Y02 | X06 | Y03 | X07 | Y04 | X08 | ... |
| ... | ... | ... | ... | ... | ... | ... | ... | ... | ... | ... | ... | ... | ... | ... | ... | ... | ... |
| ... | ... | ... | ... | ... | ... | ... | ... | ... | ... | ... | ... | ... | ... | ... | ... | ... | ... |

FIG. 5

| | | | | | | | | | | | | | | | | |
|---|---|---|---|---|---|---|---|---|---|---|---|---|---|---|---|---|
| Z00 | Z01 | Z02 | Z03 | Z04 | Z05 | Z06 | Z07 | Z08 | Z09 | Z0A | Z0B | Z0C | Z0D | Z0E | Z0F | Z10 |
| Z00 | Z01 | Z02 | Z03 | Z04 | Z05 | Z06 | Z07 | Z08 | Z09 | Z0A | Z0B | Z0C | Z0D | Z0E | Z0F | Z10 |
| ZFF | Z00 | Z01 | Z02 | Z03 | Z04 | Z05 | Z06 | Z07 | Z08 | Z09 | Z0A | Z0B | Z0C | Z0D | Z0E | Z0F |
| ZFD | ZFE | ZFF | Z00 | Z01 | Z02 | Z03 | Z04 | Z05 | Z06 | Z07 | Z08 | Z09 | Z0A | Z0B | Z0C | Z0D |
| ZFB | ZFB | ZFC | ZFD | ZFE | ZFF | Z00 | Z01 | Z02 | Z03 | Z04 | Z05 | Z06 | Z07 | Z08 | Z09 | Z0A |
| ZF7 | ZF8 | ZF9 | ZFA | ZFB | ZFB | ZFC | ZFD | ZFE | ZFF | Z00 | Z01 | Z02 | Z03 | Z04 | Z05 | Z06 |
| ZF2 | ZF3 | ZF4 | ZF5 | ZF6 | ZF7 | ZF8 | ZF9 | ZFA | ZFB | ZFC | ZFD | ZFE | ZFF | Z00 | Z01 | Z02 |
| ZEC | ZED | ZEE | ZEF | ZF0 | ZF1 | ZF2 | ZF3 | ZF4 | ZF5 | ZF6 | ZF7 | ZF8 | ZF9 | ZFA | ZFB | ZFB |

FIG. 6

| | | | | | | |
|---|---|---|---|---|---|---|
| R06 | R00 | R01 | R02 | R03 | R04 | R05 |
| U00 | U01 | U02 | U03 | U04 | U05 | U06 |
| V00 | V01 | V02 | V03 | V04 | V05 | V06 |
| R03 | R04 | R05 | R06 | R00 | R01 | R02 |
| U00 | U01 | U02 | U03 | U04 | U05 | U06 |
| V01 | V02 | V03 | V04 | V05 | V06 | V00 |
| R04 | R05 | R06 | R00 | R01 | R02 | R03 |
| U00 | U01 | U02 | U03 | U04 | U05 | U06 |
| V02 | V03 | V04 | V05 | V06 | V00 | V01 |
| R00 | R01 | R02 | R03 | R04 | R05 | R06 |
| U00 | U01 | U02 | U03 | U04 | U05 | U06 |
| V03 | V04 | V05 | V06 | V00 | V01 | V02 |
| R02 | R03 | R04 | R05 | R06 | R00 | R01 |
| U00 | U01 | U02 | U03 | U04 | U05 | U06 |
| V04 | V05 | V06 | V00 | V01 | V02 | V03 |
| R05 | R06 | R00 | R01 | R02 | R03 | R04 |
| U00 | U01 | U02 | U03 | U04 | U05 | U06 |
| V05 | V06 | V00 | V01 | V02 | V03 | V04 |
| R02 | R03 | R04 | R05 | R06 | R00 | R01 |
| U00 | U01 | U02 | U03 | U04 | U05 | U06 |
| V06 | V00 | V01 | V02 | V03 | V04 | V05 |

r(Y = 0) = 1 = 001
r(Y = 1) = 4 = 100
r(Y = 2) = 3 = 011
r(Y = 3) = 0 = 000
r(Y = 4) = 5 = 101
r(Y = 5) = 2 = 010
r(Y = 6) = 6 = 110

| ⋱ | ⋮ | ⋮ | ⋮ | ⋮ | ⋰ |
|---|---|---|---|---|---|
| ... | $X_n$ | $I_r$ | $X_{n+1}$ | $I_{r+1}$ | $X_{n+2}$ | $I_{r+2}$ | $X_{n+3}$ | ... |
| ... | $Y_{m+3+p}$ | $I_{s+2}$ | $Y_{m+2+p}$ | $I_{s+1}$ | $Y_{m+1+p}$ | $I_s$ | $Y_{m+p}$ | ... |
| ... | $X_{n+2p}$ | $I_r$ | $X_{n+1+2p}$ | $I_{r+1}$ | $X_{n+2+2p}$ | $I_{r+2}$ | $X_{n+3+2p}$ | ... |
| ... | $Y_{m+3+3p}$ | $I_{s+2}$ | $Y_{m+2+3p}$ | $I_{s+1}$ | $Y_{m+1+3p}$ | $I_s$ | $Y_{m+3p}$ | ... |
| ⋰ | ⋮ | ⋮ | ⋮ | ⋮ | ⋱ |

| ⋱ | ⋮ | ⋮ | ⋮ | ⋮ | ⋮ | ⋮ | ⋮ | ⋰ |
|---|---|---|---|---|---|---|---|---|
| ... | $X_n$ | $I_r$ | $X_{n+1}$ | $I_{r+1}$ | $X_{n+2}$ | $I_{r+2}$ | $X_{n+3}$ | ... |
| ... | $Y_{m+3+p}$ | $I_{s+2}$ | $Y_{m+2+p}$ | $I_{s+1}$ | $Y_{m+1+p}$ | $I_s$ | $Y_{m+p}$ | ... |
| ... | $X_{n+2p}$ | $I_r$ | $X_{n+1+2p}$ | $I_{r+1}$ | $X_{n+2+2p}$ | $I_{r+2}$ | $X_{n+3+2p}$ | ... |
| ... | $Y_{m+3+3p}$ | $I_{s+2}$ | $Y_{m+2+3p}$ | $I_{s+1}$ | $Y_{m+1+3p}$ | $I_s$ | $Y_{m+3p}$ | ... |
| ⋰ | ⋮ | ⋮ | ⋮ | ⋮ | ⋮ | ⋮ | ⋮ | ⋱ |

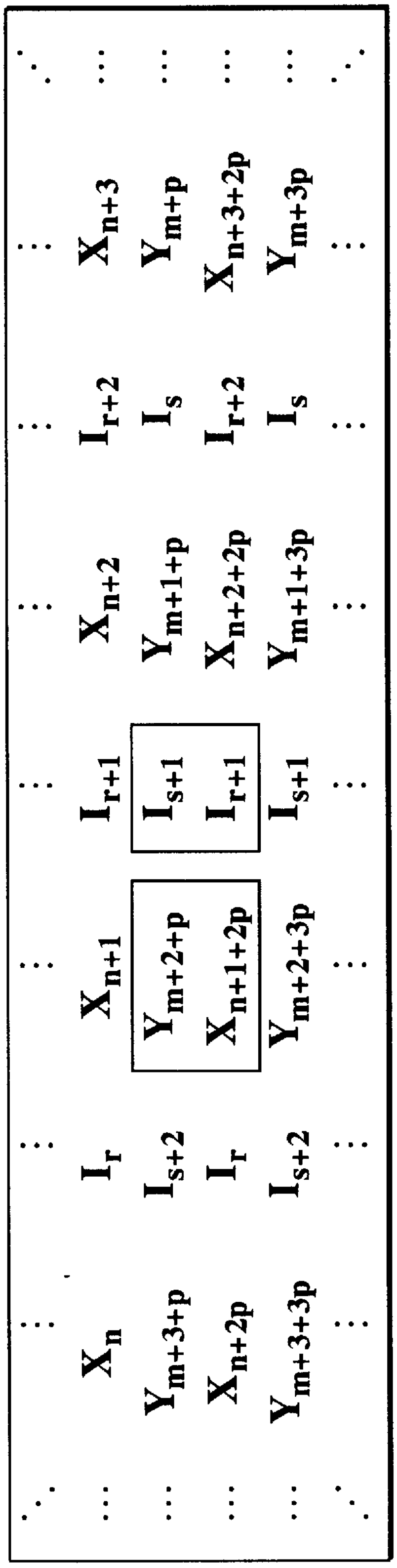

FIG. 14

PARALLEL PROPAGATING EMBEDDED BINARY SEQUENCES FOR CHARACTERIZING AND PARAMETERIZING TWO DIMENSIONAL IMAGE DOMAIN CODE PATTERNS IN N-DIMENSIONAL ADDRESS SPACE

FIELD OF THE INVENTION

This invention relates to the construction of multi-dimensional address spaces in the image domain and, more particularly, to self-clocking glyph instantiations of such address spaces.

BACKGROUND OF THE INVENTION

Self-clocking glyph codes, such as Xerox DataGlyphs, are attractive for embedding machine readable digital information in images of various types, including ordinary hardcopy documents. These codes have substantial tolerance to image distortion and noise because the digital information they encode is embedded in and fully defined by explicit machine readable marks (i.e., "glyphs"). These glyphs not only encode the information that is embedded in the code, but also define the sample clock that is employed to extract that information from the code, so they are responsible for the "self-clocking" property of the code as well as the distortion and noise tolerance.

Another known advantage of self-clocking glyph codes is that they ordinarily have an unobtrusive visual appearance. This is especially so of codes which are composed of glyphs which are written on a two dimensional spatially periodic pattern of centers, such as a regular lattice-like pattern of centers, because the spatial periodicity of the glyphs causes the code to have a more or less uniformly textured appearance. For example, logically ordered single bit digital quanta typically are encoded by respective elongated slash-like glyphs which are written on a two dimensional, spatially periodic pattern of centers in accordance with a predetermined spatial formatting rule, with the individual glyphs being tilted to the left and right of vertical by approximately +45° and −45° for encoding logical "0's" and "1's", respectively. The mutual orthogonality of the glyph encodings for the two logical states of these single bit digital quanta enhances the discriminability of the code sufficiently to enable the embedded information to be recovered, even when the code pattern is written on a sufficiently fine grain pattern of center to cause the code pattern to have a generally uniform grayscale appearance. It, however, is to be noted that it also has been shown that self-clocking glyph codes can be designed to encode multi-bit digital quanta in the glyphs.

Prior proposals have dealt with the general subject of constructing address spaces in the image domain by encoding cyclical pseudo-noise digital bit sequences (sometimes referred to as "PN sequences") and other types of maximal length-like digital bit sequences (i.e., sequences of length, L, in which every N-bit long subsequence is unique) in two dimensional spatially periodic self-clocking glyph code patterns. One of the unifying themes of these prior proposals is that they recommend constructing two dimensional address spaces by mapping at least two bit sequences of the foregoing type into such a code pattern so that these bit sequences are encoded to propagate in predetermined directions along respective non-parallel lines of glyphs. While it has been shown that the bit sequences need not be mapped into the code pattern in alignment with the principal axes thereof, it often is desirable to employ such mappings to reduce the computations that are required to determine the relative addresses of the glyphs in standard Cartesian coordinates (i.e., "x" and "y" parameters expressed in units of glyphs). Furthermore, it is known that the encodings of these bit sequences may completely or partially span the glyph code pattern, so it is to be understood that the addressing that is afforded by them is effective only within that portion of the glyph code pattern that projects onto both of the encodings. Moreover, the aforementioned bit sequences may be mapped into the glyphs on these non-parallel lines at unitary or fractional duty ratios, but it has been recognized that mappings preferably are spatially cyclical for applications in which it is desired to compute relative addresses for glyphs within the address space.

Every bit in a maximal bit length sequence resides at a predetermined uniquely determinable logical position within the sequence. Accordingly, an ordered index of integers is commonly employed to distinguish those bits from each other on the basis of their respective ordinal logical positions within the sequence. These positionally dependent index numbers can, of course, be employed for selectively addressing the glyphs which encode the bits of such a sequence. However, addressing information in at least one additional dimension is required to uniquely identify the spatial locations of those glyphs or any other glyphs that are included within a two dimensional glyph code pattern. These unique identifiers of the individual glyphs are referred to as "absolute addresses" because they identify the unique locations at which the individual glyphs reside within the glyph code pattern.

As is known, the spatial address (i.e., the absolute address) of almost any given glyph in an address space of the foregoing type is identifiable, at least to a first approximation, by a metric which specifies the offset distances (if any) between the nominal center of the given glyph and the non-parallel lines of glyphs that encode the respective maximal length bit sequences, where these offsets are measured parallel to the principal axes of the code pattern and are expressed in units of glyphs. In applications where the maximal length sequences are encoded by glyphs on orthogonal lines which align with the principal axes of a self-clocking glyph code pattern that is written on a regular rectangular lattice of centers, the above-described metric reduces to an x/y coordinate pair which identifies the spatial location of the given glyph with substantial precision in a standard Cartesian coordinate system. Unfortunately, however, the intersections of the lines on which these maximal bit length sequences are encoded tend to restrict the freedom of design choice if there are glyphs at any of these intersections.

It has been shown that this unwanted limitation on the explicit spatial addressing of glyphs in self-clocking glyph code patterns can be avoided if the glyphs are written on a lattice of centers of predetermined width and/or height, so that there are a known or determinable fixed number of glyphs on every line of the code pattern along at least one of those dimensions. More particularly the solution that has been proposed for this special class of code patterns is to encode a maximal length bit sequence (or a combination of interleaved, relatively prime maximal length bit sequences) in the glyphs in a raster-like pattern which is selected to cause the logically ordered bits of the sequence to spatially propagate from side-to-side along a known dimension (say, the width) of the code pattern which more gradually propagating along the other (e.g., the height) of the code pattern in, say, top-to-bottom order. This raster encoding of the maximal length bit sequence effectively "folds" the bit sequence into the code pattern module a known or computable number of glyphs (i.e., the number of glyphs that the code pattern contains along its known dimension). Accordingly, the spatial address of any given glyph within the code pattern can be computed in x/y coordinate space from the sequence index number of the bit that is encoded by the glyph by dividing the sequence index number of the bit by the known glyph count/line modules.

Unfortunately, this raster encoding style solution to the spatial addressing problem is not only limited to a constrained class of code patterns, but also tends to be computationally costly. The computational costs of this approach are elevated because the subsequence bit length, N, over which the maximal length bit sequence must be unique scales as a function of the square root of the address space that is being served. This scaling is an inherent consequence of the fact that the number of unique phases (or "bit index positions") of a maximal length bit sequence is given by $N^2-1$.

Clearly, therefore, it would be desirable to have a more flexible technique for embedding logically ordered address information in some or all of the glyphs of self-clocking glyph code patterns for more computationally efficiently identifying the unique spatial locations of individual glyphs within such code patterns. Indeed, it would be desirable to parameterize such code patterns in N-dimensional space where $N \geqq 2$.

SUMMARY OF THE INVENTION

To that end, a code pattern such as a self-clocking glyph code pattern is parameterized in at least one further dimension by the selection of the parallel propagating unique numeric sequences that are employed for parameterizing the code pattern in two-dimensional space and additional sequence is embedded in the code pattern for identifying the parameterizing sequences that are being used.

BRIEF DESCRIPTION OF THE DRAWINGS

Still further objects of this invention will become apparent when the following detailed description is read in conjunction with the attached drawings, in which:

FIGS. 2–8 schematically illustrates two dimensional image domain address spaces that are constructed by embedding address information in self-clocking glyph code patterns or the like in accordance with this invention;

FIG. 14 illustrates, in fragmentary form, code labeling of an address space.

DETAILED DESCRIPTION OF THE INVENTION

While the invention is described in some detail hereinbelow with reference to certain illustrated embodiments, it is to be understood that it is not limited to those embodiments. On the contrary, the intent is to cover all modifications, alternative, and equivalents falling within the spirit and scope of the invention as defined by the appended claims.

A. Self Clocking Glyph Codes

Figure 1:
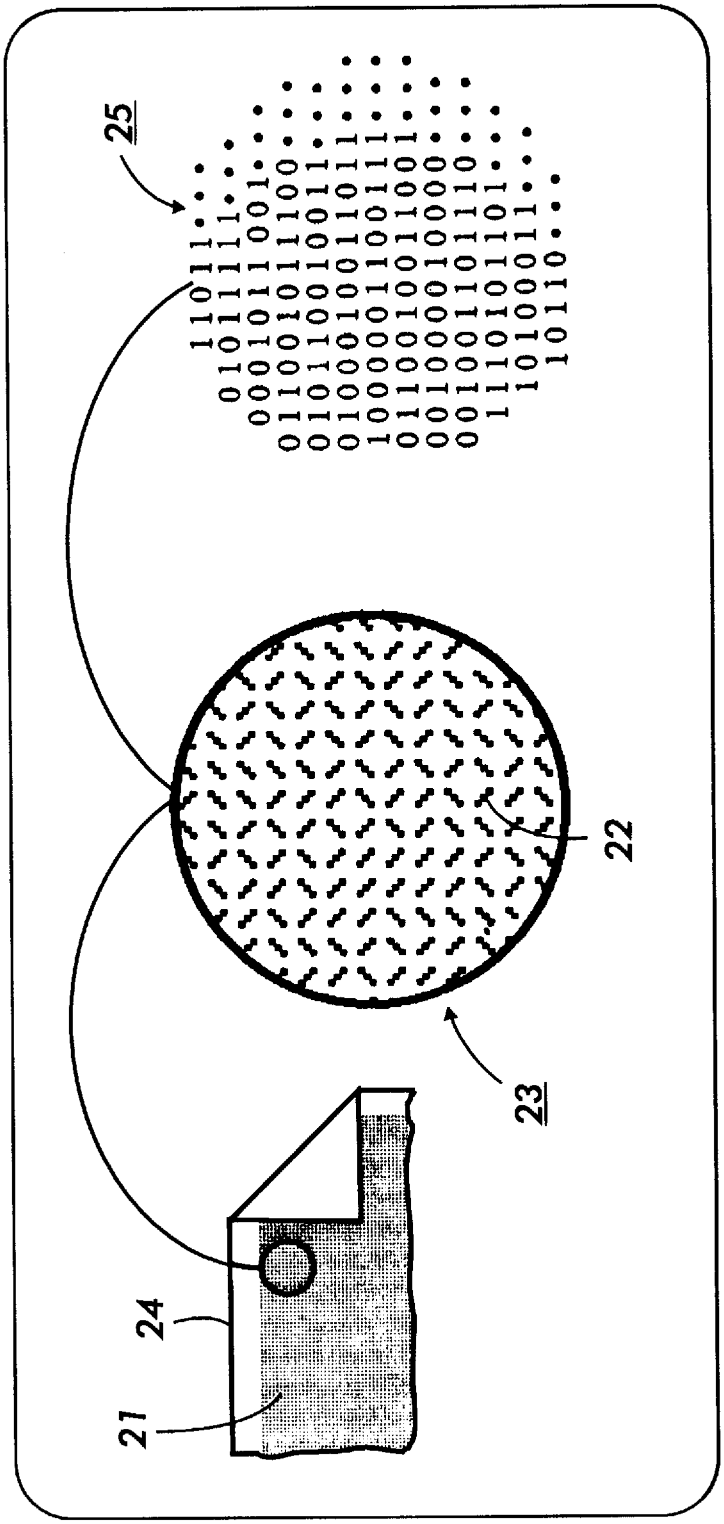
FIG. 1 illustrates a self-clocking glyph code pattern and a portion of its binary interpretation.

Turning now the drawings, and at this point especially to FIG. 1, there is a more or less conventional self-clocking glyph code pattern 21 which is composed of elongated slash-like marks or "glyphs" 22 and 23 that are written ii on a generally regular rectangular lattice of centers on a suitable recording medium 24. Suitably, the glyphs 22 and 23 are printed by a printer (not shown) operating at 300 d.p.i.–600 d.p.i. to write 4 pixel×4 pixel–7 pixel×7 pixel representations of the glyphs 22 and 23 on regularly spaced centers that are distributed widthwise and lengthwise of the recording medium 24 to produce the rectangular code pattern 21. The glyphs of these fine grain glyph code patterns are not easily resolved by the unaided human eye when the code patterns are viewed under standard lighting conditions and at normal reading distances, so the code pattern 21 typically has a generally uniform gray scale appearance. Nevertheless, the glyph code is still capable of effectively communicating machine readable digital information. To carry out this function, the glyphs 22 and 23 usually are titled to the left and right, at about +45° and −45° with respect to the longitudinal dimension of the recording medium 24 to encode binary "1's" and "0's", respectively, as shown at 25.

B. The Relative Phase of Parallel Propagating Embedded Maximal Length Bit Sequences as a Spatial Address Parameter FIGS. 2–8 diagramatically illustrate image domain address spaces which are constructed by embedding multiple instances of one (FIGS. 3 and 6) or two (FIGS. 2, 4, 5, 7 and 9) maximal length bit sequences ("Z" in FIGS. 3 and 6, "X" and "Y" in FIGS. 2, 4 and 5, and "U" and "V" in FIGS. 7 and 8) in a self-clocking glyph code pattern 21 (FIG. 1). These maximal bit length sequences are encoded by the glyphs on parallel lines of the glyph code pattern to propagate in a predetermined direction, such as a left-to-right direction, from one side of the address space to the other. However, the relative phase, $\phi_R$, of the bit sequences (or at least certain of the bit sequences—see FIG. 4) that are encoded on neighboring ones of these lines incrementally varies as a function of the transverse positioning of those lines in the address space (i.e., as a function of the position of those lines in the address space. The phase shift corresponds to translating the code parallel to its linear direction by an integer number of bits.

In the address spaces shown in FIGS. 2, 3, and 5–8, the maximal length bit sequence encoded on all of the odd numbered lines are phase aligned. However, the sequences encoded on the other or even numbered lines are phased shifted to the right, in successive one bit position increments, so the transverse positioning of any given even numbered line in these address spaces is given by:

$$Y=2\phi_R+1 \qquad (1)$$

Where: $\phi_R$= the phase of the sequence encoded on the given even numbered line relative to the phase of the sequence encoded a neighboring odded numbered line Equation (1) can, of course, be restated for any constant incremental phase shift, $\Delta\phi$, as follows:

$$Y=\frac{2\phi_R+\Delta\phi_R}{\Delta\phi_R} \qquad (2)$$

Furthermore, it follows from equation (1) that the relative transverse position of the sequence encoded on the immediately preceding odd numbered line is given by:

$$Y=2\phi_R \qquad (3)$$

While the transverse positioning of the sequence encoded on the immediately following odd numbered line is given by:

$$Y=2(\phi_R+1) \tag{4}$$

The phase differences $\phi_R$ between the odd and even numbered lines can be computed in either order, provided that a consistent order is employed.

The best practice for identifying the location of a given glyph with respect to the transverse or Y-axis of such an address space is to capture a sufficiently large area of the address space to determine the phase of the sequence that is encoded on the line containing the given glyph relative to the phases of the sequences encoded on the next preceding and next following lines of the address space. The two-way relative phase analysis that is enabled by this three sequence phase determination effectively discriminates between odd and even numbered lines in the address space, even if one or more of the sequences has "rolled over" in the address space. As will be appreciated, the principal implication of this two-way relative phase analysis technique is that it requires that capture of a sufficiently large number of the bit encodings from each of the three sequences to phase lock on to each of those sequences. Typically, pattern matching (or sliding window correlation) process is employed to find the phase locked state in a maximal length bit sequence. For cases where the width, W, of the address space equals the length, L, of the maximal bit length sequence in question, this correlation process requires a capture of at least N bits sequence, where N is the unique subsequence bit length of the maximal bit length sequence to establish phase lock (preferably, the correlation process given approximately 2N bits or more to establish phase lock with a desirable higher degree of confidence in its correctness). Note the maximal PN sequence ordinal position can be correlated normally even in the neighborhood of rollover at the end of the code (the code is cyclic). If a truncated PN sequence or the like is used, a somewhat larger typical capture region (no more than twice the extent along the linear code direction) would be needed to assure ambiguous address determination. If any one of a family of sequences may be used, more glyphs in the sequence may be needed to distinguish allowed sequences.

Figure 7:
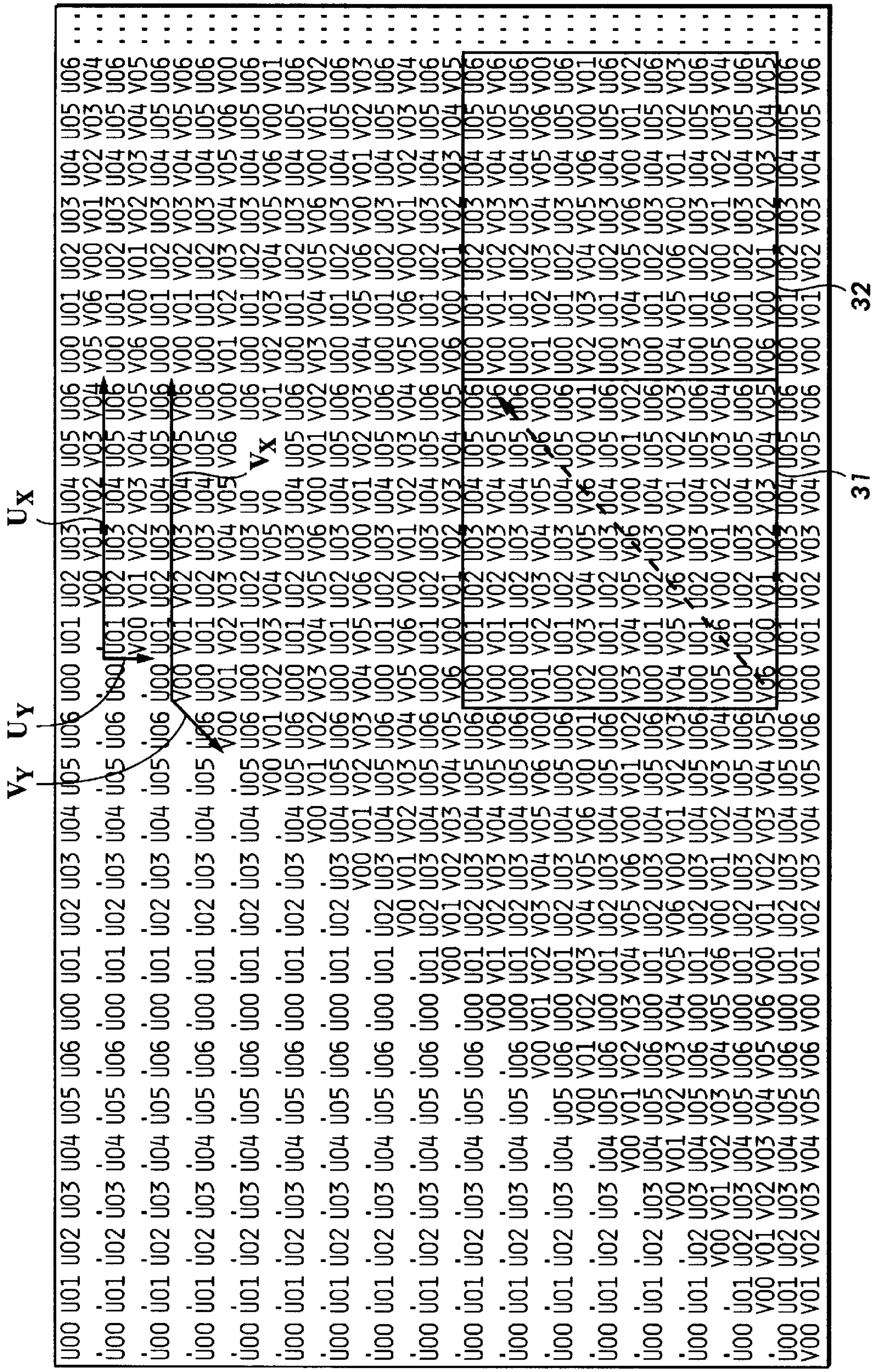

As shown in dashed lines in FIG. 7, phase roll over can be avoided by reducing the effective address space by a factor of two, so that all phase shifts are in the same absolute direction (i.e., same sign sense). That, in turn, permits a one-way relative phase analysis is to be used for determining the relative transverse positions (i.e., the positioning relative to the Y-axis) of the lines of such an address space glyphs on the odd and even numbered lines encode different maximal bit length sequences (such as at "X" and "Y" in FIGS. 2, and U and V in FIGS. 7 and 8) because the sequences themselves can then be used to distinguish between the odd and even numbered lines. However, it is believed that the relative phase difference, $\phi_R$, between the maximal length bit sequences propagating on any two neighboring lines of the address space can be determined from the difference between the sequence index numbers, i and j, of the bits of those respective sequences that are encoded by any transversely aligned glyphs on those respective lines. More particularly, it is believed phase difference $\phi_R$ can be determined from the difference, if any, of the sequence index numbers by (1) summing the index difference (i−j) with (2) the smallest integer multiple of the width, W, of the address space width which (3) yields a positive integer multiple that is (4) evenly divisible by the relative incremental phase shift of the respective sequences; (5) by dividing the positive integer that is found at step 3 to satisfy the condition specified by step 4; and by then (6) evaluating the quotient resulting from step 5 module the width, W (in glyphs), of the address space. While this formulation has not been fully tested for all cases, its effectivity has been confirmed with substantial rigor for the address space shown in FIG. 8 (i.e., where the maximal bit length sequences on the odd and even numbered lines are incrementally phase shifted; each by one bit sequence index position, but in opposite directions to provide a relative incremental phase shift of two bit positions. Further, its effectivity has been less rigorously confirmed for the address spaces of the type shown in FIG. 2 (i.e., incremental relative phase shift of just one bit index position.

As will be appreciated, the bit sequence indices of the unshifted maximal length bit sequences suitably are employed to identify the spatial location of the glyphs that encode those sequences with respect to the X-axis of the address space. Thus, once the spatial positions of the lines on which those sequences are encoded are located relative to the Y-axis of the address space, there is a unique x/y coordinate pair for identifying the spatial location of each of those glyphs is the address space. A similar process is employed to determine the x/y coordinate pairs for the glyphs that encode the phase shifted maximal length bit sequences, except the bit sequence indices of those sequences are normalized to account for the accumulated phase shift and roll over of those sequences prior to computing the positions of the glyphs that encode those sequences relative to the X-axis of the address space.

Focusing for a moment on FIG. 4, it will be seen that glyph encodings of maximal length bit sequences which define the X and Y coordinates of the is address space may be interleaved on each of a set of parallel lines of the glyph code pattern. As illustrated, the phase of the "Y" sequence is incrementally shifted to the right on each line of the code pattern, so the relative phases of the interleaved "X" and "Y" sequences that are encoded on the respective lines of the code pattern may be employed, as previously described, to determine the locations of the respective lines of the code pattern relative to the Y-axis of the address space. Furthermore, the process that is described above may be employed to locate the individual glyphs of the code pattern relative to the X-axis of the address space.

Referring to FIG. 5, it will be understood that an interleaved construction of the address space is particularly beneficial for applications in which data encodings, D, or the like are transversely interlaced with the spatial addressing information. For these applications, the addressing information is cyclically encoded at a predetermined fractional duty cycle ratio, such as ⅕ as shown, so an appropriately phased scaling factor is used to compute the location of the encodings of the address information relative to the Y-axis of the address space. Once these locations have been determined, the locations of the data encodings relative to the Y-axis of the address space can also be identified by using the self-clocking properties of the glyph code.

While incremental linear phase shifts of the maximal bit length sequences that define the address space are typically employed to parameterize the address space relative to one axis, such as the Y-axis as described above, incremental arithmetic phase shifts of various type can be employed for that purpose. For example, as shown in FIG. 6, a cumulative arithmetic function is used to cause the relative phase difference between the maximal bit length sequences that are encoded on neighboring lines of the code to directly parameterize the position of one of those lines (i.e., the lower line) relative to the Y-axis of the address space.

Figure 8:
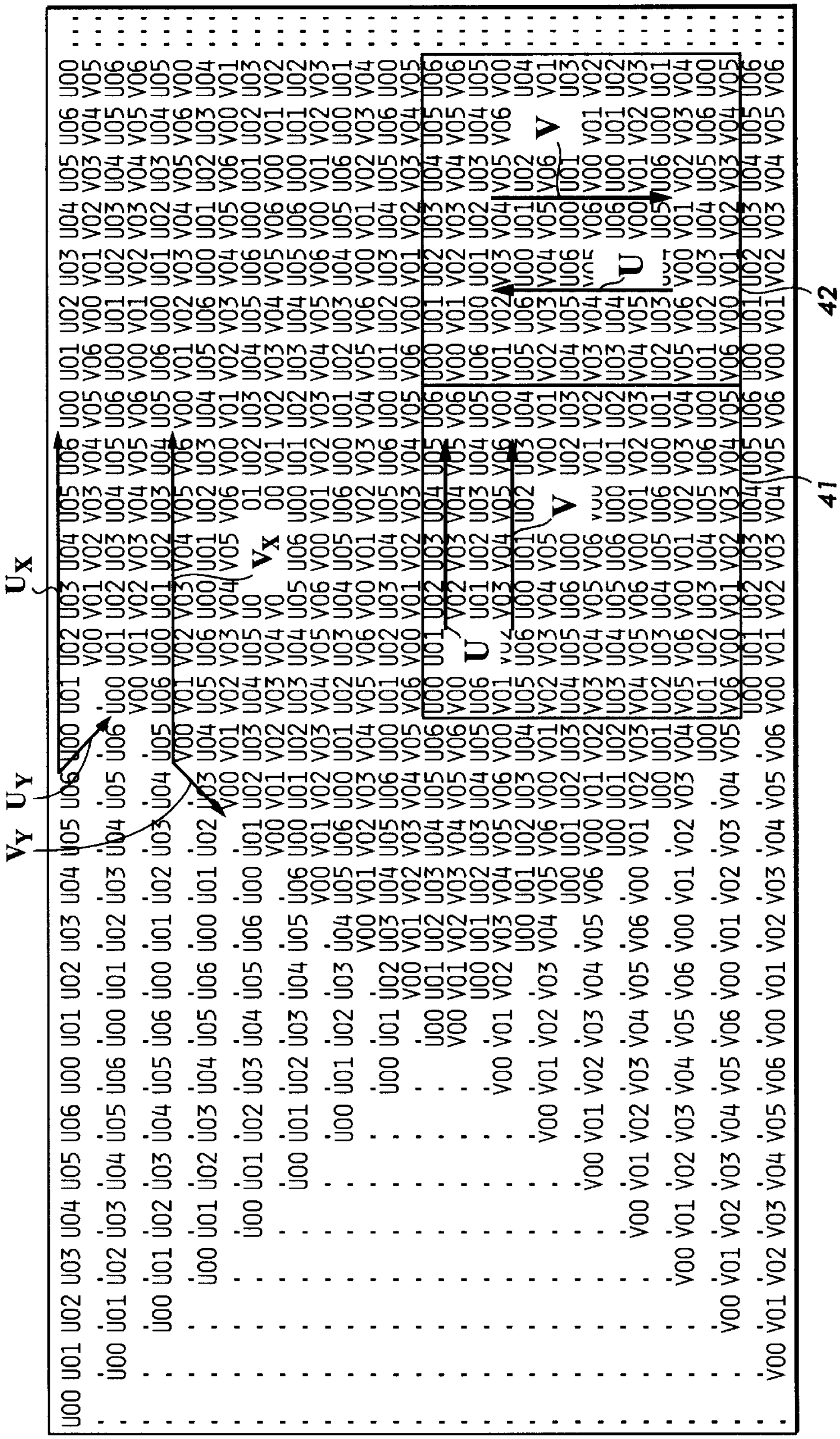

Turning now to FIGS. 7 and 8, it will be seen that address spaces that are parameterized relative to one axis by linear incremental phase shifts advantageously are constructed by tiling the maximal length bit sequence or sequences into the glyph code pattern on tiling vectors that map the bit sequences into the code pattern with the desired relative phase shifts. For example, as shown in FIG. 7, the "U" and "V" maximal length bit sequences are tiled into the glyph code pattern on tiling vectors $U_x$, $U_y$ and $V_x$, $V_y$, respectively, which interlace those sequences on alternate parallel lines of the code pattern, while incrementally shifting the "V" sequence one bit index position to the right on every other line of the code pattern. This, of course, creates an address space 31 of the type that is shown in FIG. 2. Indeed, the tiled construction of the address space 31 distributively replicates that space at other locations in the glyph code pattern, such as at 32, thereby providing a distributed redundancy in code patterns that are sufficiently large to encode these multiple instances 31 and 32 of the address space. Note, all of the address codes may be tiling; the ones having fixed line-to-line shifts for each code are "periodic" tilings.

FIG. 8 illustrates a tiled construction where the "U" and "V" maximal length bit sequences are tiled into the glyph code pattern on tiling vectors $U_x$, $U_y$ and $V_x$, $V_y$ respectively, which also interleave those sequences on alternate parallel lines of the code pattern. However, unlike the "mono shear" tiled case shown in FIG. 7, in this embodiment that tiling vectors produce a "dual shear" tiling of the sequences U and V, such those sequences are incrementally phase shifted one sequence index position to the left and right, respectively, on every other line of the code pattern. This tiling creates address spaces 41 and 42 which contain precisely the same members, but the members of those address spaces 41 and 42 differ in both their spatial and logical organization, so the organization that best fits a given application can be used.

Figure 9:
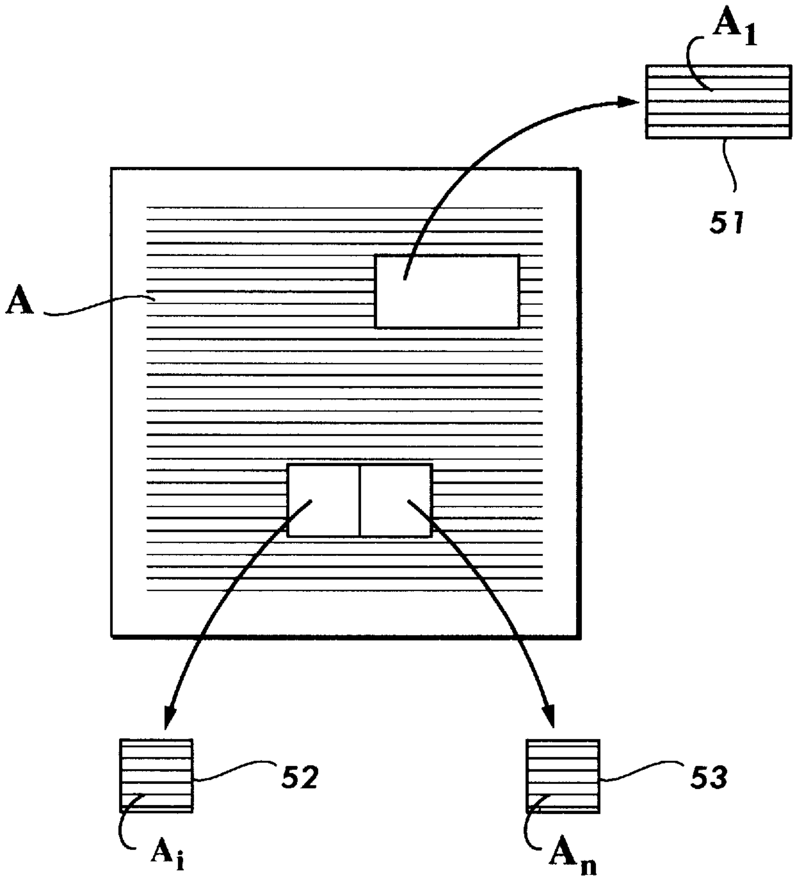
FIG. 9 illustrates a fragmentation of an address space of the type shown in FIGS. 2–8.

Turning now to FIG. 9, it will be evident that contiguous and/or non-contiguous non-overlapping fragments $A_1 \ldots A_n$ of an address space A of above described type may be written on different substrates 51–53. Each of these fragments $A_1 \ldots A_n$ must contain a sufficiently large sample of the maximal length bit sequences that parameterized the address space A in the image domain to permit the x/y coordinate pairs for the glyphs they contain to be computed as described above, but they otherwise can be sized as required to best satisfy the needs of a given application. The fragments $A_1 \ldots A_n$ need not define a complete cover of the address space, but one of the more attractive applications of this feature is to print out contiguous fragments of a large address space A on multiple substrates so that these printed fragments provide an essentially complete cover of the address space A.

Figure 10:
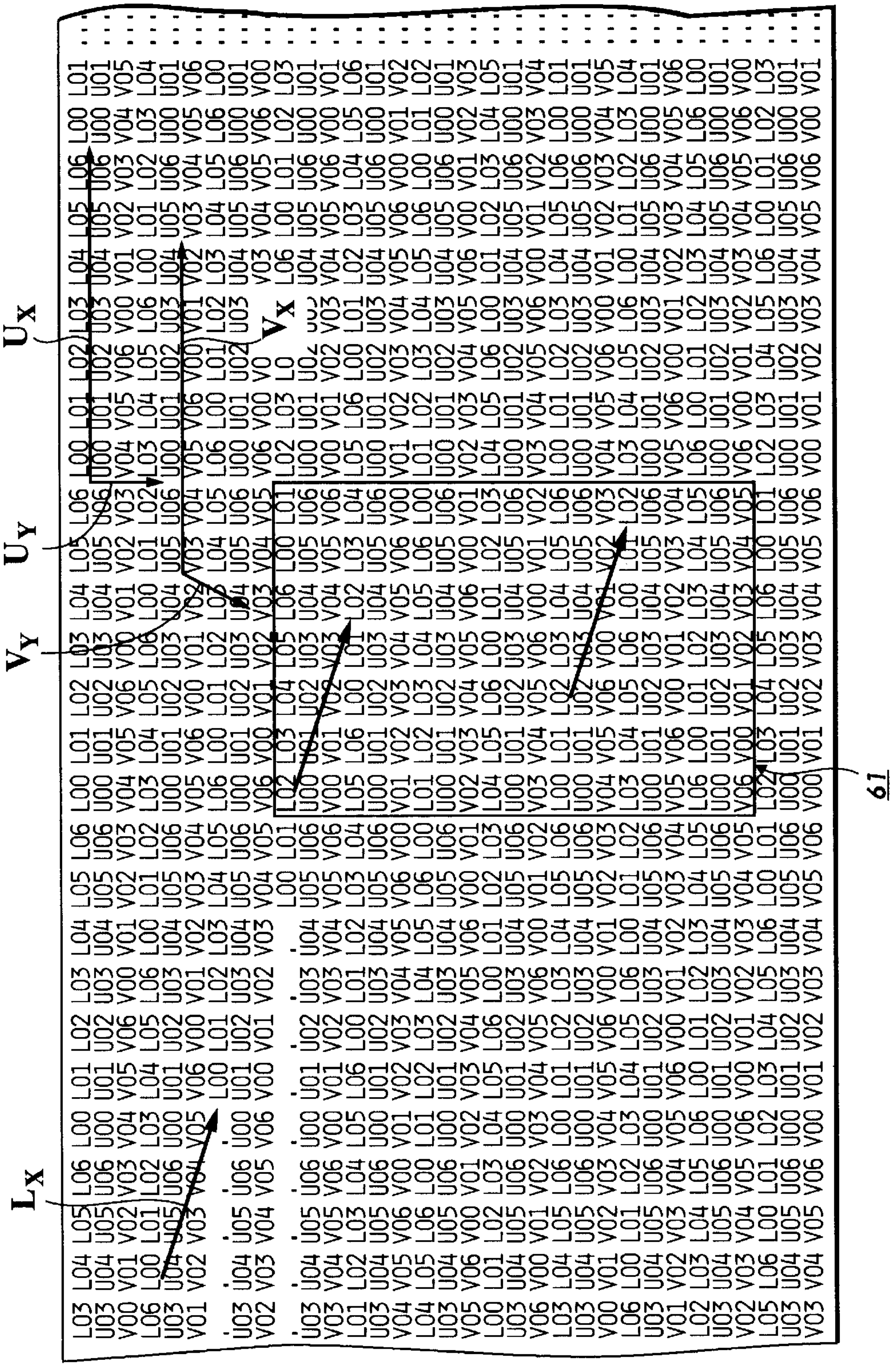
FIGS. 10–12 illustrate the labeling of address spaces of the type shown in FIGS. 2–8.

C. The Relative Phase of an Interlaced Parallel Propagating Maximal Length Bit Sequences as a Labeling Parameter for Spatial Address Spaces Referring to FIG. 10, the functionality of address spaces of the foregoing type can be extended by cyclically interlacing (or interleaving) encodings of another parallel propagating maximal length bit sequence L with the encodings of the sequence or sequences, such as U and V, which parameterize the address space 61 with respect to its x/y coordinates. This additional bit sequence L further parameterizes the address space 61 by embedding a machine readable distributed label in it. As shown in FIG. 10, this label is a numeric value which is determined by the incremental phase shift between successive encodings of the sequence L. This phase shift may, of course, be adjusted to selectively embed any one of a plurality of different labels in the address space 61. A look-up table or the like (not shown) can be employed to interpret the embedded label based on its numeric value. In this embodiment, the distributed label L is independently interpretable.

Figure 11:
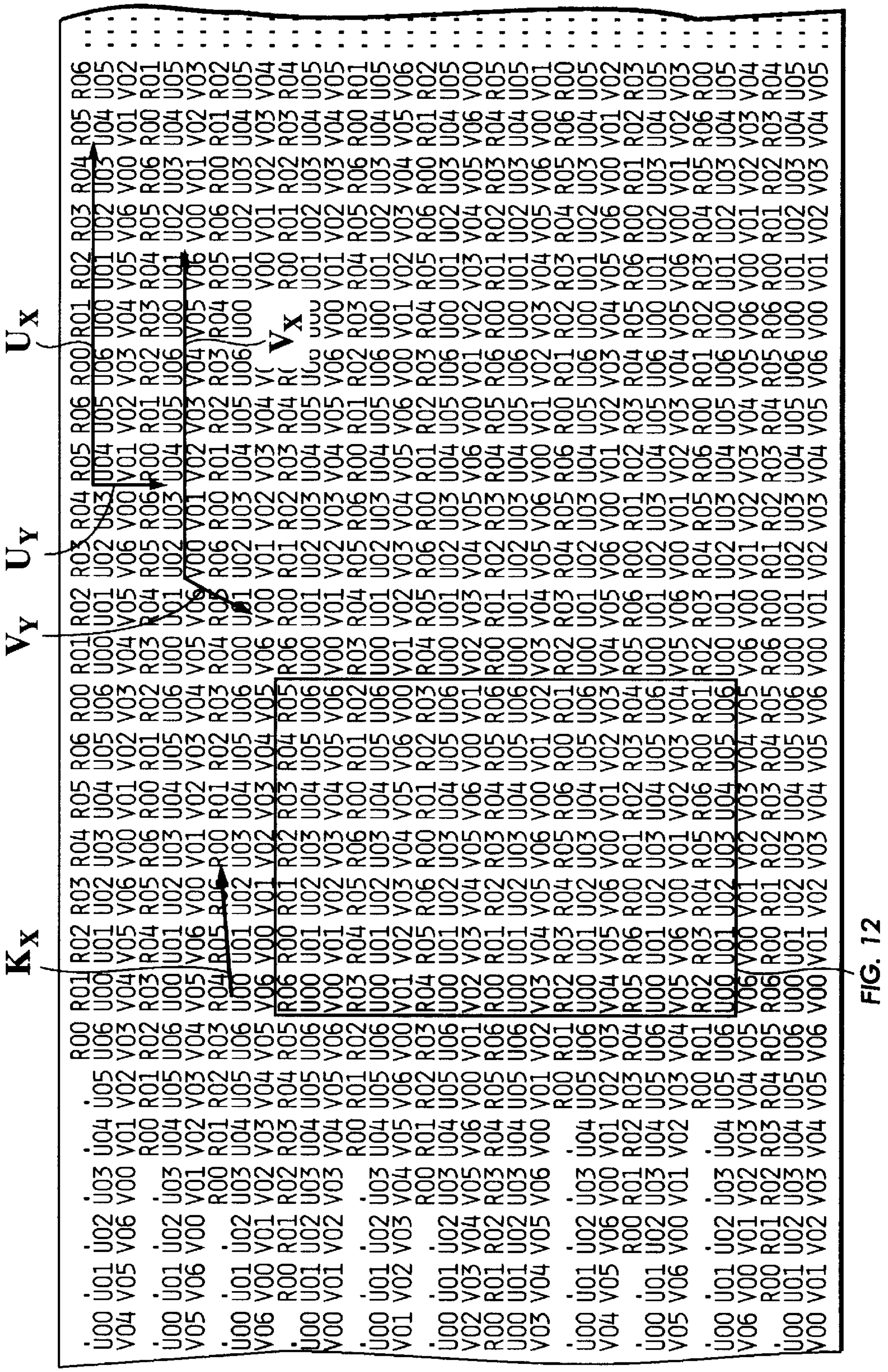
Figure 12:
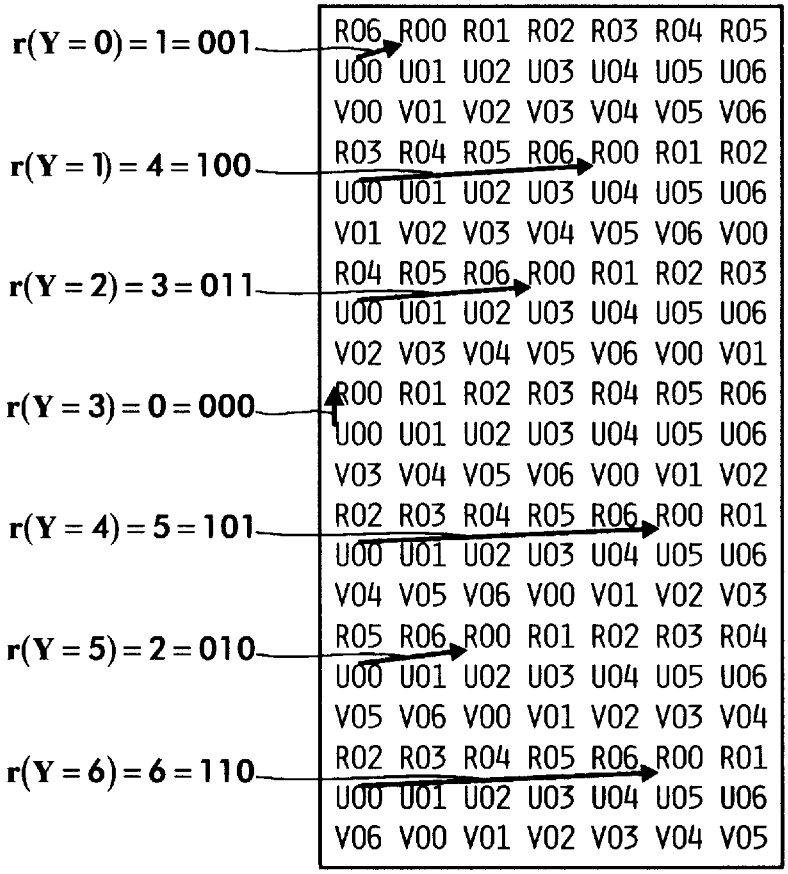

However, as shown in FIGS. 11 and 12, a distributed labeling that requires a computationally less intensive read out of the address space is provided if the encodings of the labeling sequence, r, is referenced to the encodings of one or another of the address defining sequence U or V. This relatively minor change avoids the correlation processing which the embodiment of FIG. 10 requires to latch on to the phase of the reference copy of the labeling sequence.

Figure 13:
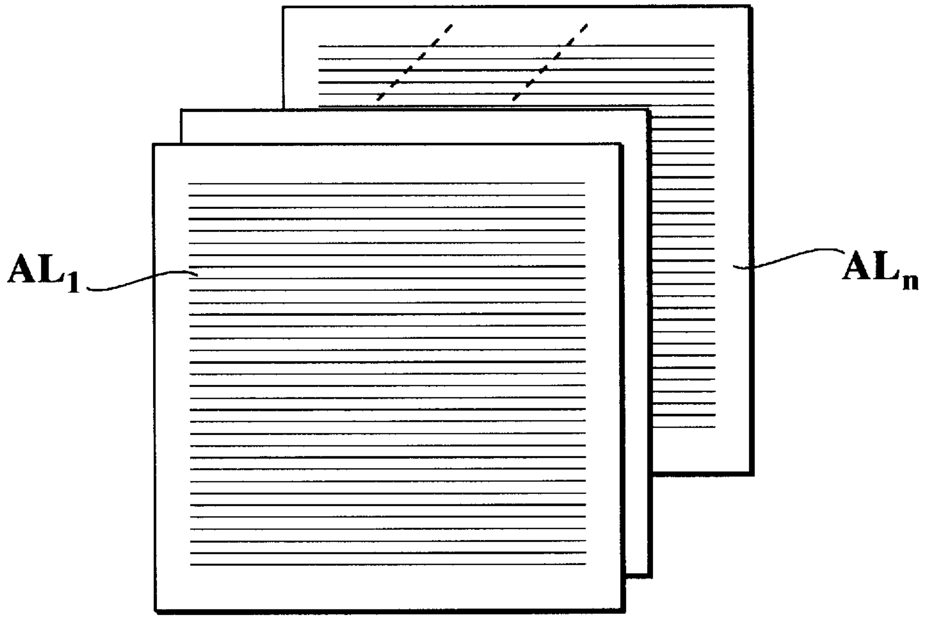
FIG. 13 illustrates an application of labeled address spaces of the type shown in FIGS. 10–12.

Turning to FIG. 13, one of the advantages of including a distributed labeling parameter in address spaces of the foregoing type is that the labeling provides a hierarchical mechanism for distinguishing between address spaces that include otherwise identical address parameters. This hierarchical labeling mechanism may be used, for example, to classify the address spaces $AL_1 \ldots AL_n$ for various purposes or to index the address spaces $AL_1 \ldots AL_n$ into a hierarchically organized look-up table or the like.

D. Further Characterizing N Dimensionally Parameterized Code Pattern By Selection of Parameterizing Code Sequences It is desirable for some applications to select the maximal length bit sequences that parameterize the glyph code pattern in two dimensions from a family of candidates so that the selection of one or both of those sequences effectively parameterizes (i.e., "labels") the glyph code pattern in accordance with still another metric. However, the computational cost of testing all, or even a significant subset of the maximal bit length sequences that might be candidates for such a selection is likely to be prohibitive.

Thus, as shown in FIG. 14, to reduce the computation cost of implementing this type of address space labeling (or "characterization"), encodings of a prespecified maximal length bit sequence I are interleaved (typically at a 50% duty ratio) with the encodings of the address space parameterizing maximal length bit sequences, X and Y. Accordingly, one or both of the parameterizing sequences X and Y may be selected from a family of potentially suitable sequences to further characterize the address space in accordance with any desired metric. This freedom to select does not significantly reduce the computation cost of interpreting the address space because the relative phase difference between the transversely neighboring instances of the prespecified (i.e., "known") sequence is set to uniquely identify the sequences X and Y that have been selected to parameterize the glyph code pattern in address space.

In the embodiment shown in FIG. 13, neighboring instances of the known sequence I, as well as neighboring instances of the X and Y sequences, are counterpropagating. It, therefore, should be understood that counterpropagating sequences need not be used since the relative phasing of these sequences can be determined as described hereinabove when they propagate in the same direction.

What is claimed is:

1. A process for constructing a machine readable N-dimensional address space comprising registering a two dimensional code pattern with a two dimensional lattice of generally uniformly spaced centers to identify at least one set of parallel, transversely spaced apart lines within said code pattern:

encoding first and second cyclically interleaved unique numeric sequences on at least certain of said lines of said code pattern; at least certain instances of said second sequence being a selection made from a plurality of candidates in accordance with a predetermined metric, with neighboring instances of said second sequence being phased relative to each other so that there is a phase difference therebetween that incrementally increases transversely of said code pattern; all instances of said first sequence being a prespecified sequence, with neighboring instances of said first sequence having a constant phase relationship that is set to identify all selected instances of said second;

whereby said instances of said second numeric sequence parameterize one dimension of said code pattern, the relative phase difference between neighboring instances of said second sequence parameterizes a second dimension of said code pattern, and said selected instances of said second sequence further parameterize said code pattern with respect to said metric.

2. The address space of claim 1 wherein said code pattern is a self-clocking glyph code pattern having glyphs registered essentially on each of said centers.

3. The address space of claim 2 wherein said glyphs are slash-like marks which are tilted to the left and right at about +45° and −45° for encoding binary “1’s” and “0’s”, respectively.

4. The address space of claim 1 wherein each of said numeric sequences is a maximal bit length sequence.

* * * * *